US007685447B2

(12) United States Patent
Parker

(10) Patent No.: US 7,685,447 B2
(45) Date of Patent: Mar. 23, 2010

(54) CIRCUIT INTERRUPTER AND METHOD MODULATING CONFIGURABLE PROCESSOR CLOCK TO PROVIDE REDUCED CURRENT CONSUMPTION

(75) Inventor: Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 816 days.

(21) Appl. No.: 11/481,294

(22) Filed: Jul. 5, 2006

(65) Prior Publication Data

US 2008/0010472 A1 Jan. 10, 2008

(51) Int. Cl.
*H02H 9/02* (2006.01)

(52) U.S. Cl. ...................... 713/322; 361/93.1; 361/93.2

(58) Field of Classification Search ................. 713/322; 361/93.1, 93.2

See application file for complete search history.

(56) References Cited

U.S. PATENT DOCUMENTS 5,285,452 A * 2/1994 Wee et al. ..................... 714/22
6,274,949 B1 * 8/2001 Lioux et al. .................... 307/64
6,574,739 B1 * 6/2003 Kung et al. .................. 713/322
7,304,828 B1 * 12/2007 Shvartsman ............... 361/93.1
7,400,482 B2 * 7/2008 Parker ........................ 361/93.1
2003/0187520 A1 * 10/2003 Pearlman et al. .............. 700/11
2006/0044723 A1 * 3/2006 Beneditz et al. ............... 361/90

OTHER PUBLICATIONS

Microchip Technology Inc., "PIC16F631/677/685/687/689/690 Data Sheet", 2006, pp. i, 47, 48, 51, 53.

* cited by examiner

*Primary Examiner*—Abdelmoniem Elamin
(74) *Attorney, Agent, or Firm*—Martin J. Moran

(57) ABSTRACT

A circuit breaker includes separable contacts, an operating mechanism structured to open and close the separable contacts, a current sensor structured to sense current flowing through the separable contacts, a microprocessor cooperating with the sensor and the operating mechanism to trip open the separable contacts, and a power supply structured to at least power the microprocessor. The microprocessor includes a configurable clock and a routine structured to reduce current consumption from the power supply through modulation of the configurable clock.

4 Claims, 3 Drawing Sheets

CIRCUIT INTERRUPTER AND METHOD MODULATING CONFIGURABLE PROCESSOR CLOCK TO PROVIDE REDUCED CURRENT CONSUMPTION

BACKGROUND OF THE INVENTION

1. Field of the Invention

This invention pertains generally to circuit interrupters and, more particularly, to such circuit interrupters employing a processor. The invention also relates to methods for reducing current consumption for a circuit interrupter.

2. Background Information

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

With the increasing popularity of portable battery-powered electronic devices (e.g., cell phones; MP3 players; digital cameras), many electronic manufacturers are developing components with features specifically designed for low-power operation. There are also many well-known design techniques for reducing the power consumed by microcontrollers including, for example, reducing power supply voltage, employing "sleep" modes (which reduce power supply current consumption by temporarily shutting off the microprocessor primary clock source) and employing relatively lower clock speeds. Of these techniques, it is believed that "sleep" modes cannot be used in a circuit breaker application, because too many cycles (and too much time) are required for the primary clock source to restart when the microprocessor "wakes up". Also, it is believed that power supply voltage(s) and a single processor clock speed are selected to give the "best" overall performance in terms of desired processing capability and power consumption.

At least one manufacturer has introduced microcontrollers with a hardware feature that allows software selection between several internal clock frequencies. For instance, the Microchip PIC16F685 microcontroller, marketed by Microchip Technology Incorporated of Chandler, Ariz., has a 31 kHz internal clock and an 8 MHz internal clock with a postscaler. With the proper configuration, this microcontroller can be driven by an internal clock frequency of 31 kHz, 125 kHz, 250 kHz, 500 kHz, 1 MHz, 2 MHz, 4 MHz or 8 MHz. The microcontroller can switch between any of these internal clock frequencies while being operated by software control within a single microcontroller execution cycle.

The power supply of, for example, a microcomputer-based miniature circuit interrupter contributes to increases in internal operating temperature and, thus, may impact the normal operating temperature range of the circuit interrupter.

Accordingly, there is room for improvement in circuit interrupters.

There is also room for improvement in the current consumption of a circuit interrupter processor.

SUMMARY OF THE INVENTION

These needs and others are met by embodiments of the invention, which reduce circuit interrupter processor current by using a routine to reduce the clock speed of the processor when the routine is otherwise idle.

In accordance with one aspect of the invention, a circuit interrupter comprises: separable contacts; an operating mechanism structured to open and close the separable contacts; a sensor structured to sense current flowing through the separable contacts; a processor cooperating with the sensor and the operating mechanism to trip open the separable contacts; and a power supply structured to at least power the processor, wherein the processor includes a configurable clock, and wherein the processor further includes a routine structured to reduce current consumption from the power supply through modulation of the configurable clock.

The configurable clock may have a frequency; and the routine may be further structured to reduce current consumption from the power supply by lowering the frequency of the configurable clock when the routine is otherwise idle.

The routine may include a background loop and a foreground loop.

The background loop may be structured to periodically collect data from the sensor; and the foreground loop may be structured to process the data from the background loop.

The routine may be further structured to raise the frequency of the configurable clock when the background loop is periodically collecting the data or when the foreground loop is processing the data from the background loop.

The routine may be further structured to lower the frequency of the configurable clock when the background loop is not periodically collecting the data and when the foreground loop is not processing the data from the background loop.

The foreground loop may be structured to raise the frequency of the configurable clock and process the data from the background loop after a predetermined plurality of samples of current from the sensor have been collected.

The foreground loop may be further structured to determine whether a fault condition has occurred and to responsively either: (a) trip the circuit interrupter responsive to the fault condition, or (b) lower the frequency of the configurable clock responsive to the absence of the fault condition.

The background loop may be structured to raise the frequency of the configurable clock and collect a sample of current from the sensor.

The processor may be a microcomputer including a timer; and the background loop may be further structured to periodically execute responsive to an interrupt from the timer, to determine if the foreground loop was processing the data, and to responsively either: (a) return execution to the foreground loop without lowering the frequency of the configurable clock responsive to the foreground loop processing the data, or (b) lower the frequency of the configurable clock responsive to the foreground loop not processing the data.

As another aspect of the invention, a method of reducing current consumption for a circuit interrupter comprises: sensing current flowing through separable contacts; employing a processor to input the sensed current flowing through the separable contacts and to open the separable contacts; powering the processor from a power supply; employing the processor including a configurable clock; and modulating the configurable clock to reduce current consumption from the power supply.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term “modulation” or “modulate” or derivatives thereof means to vary (i.e., increase and decrease) the frequency of a signal (e.g., a clock signal of a processor).

The invention is described in association with a miniature circuit breaker, although the invention is applicable to a wide range of circuit interrupters.

Figure 1:
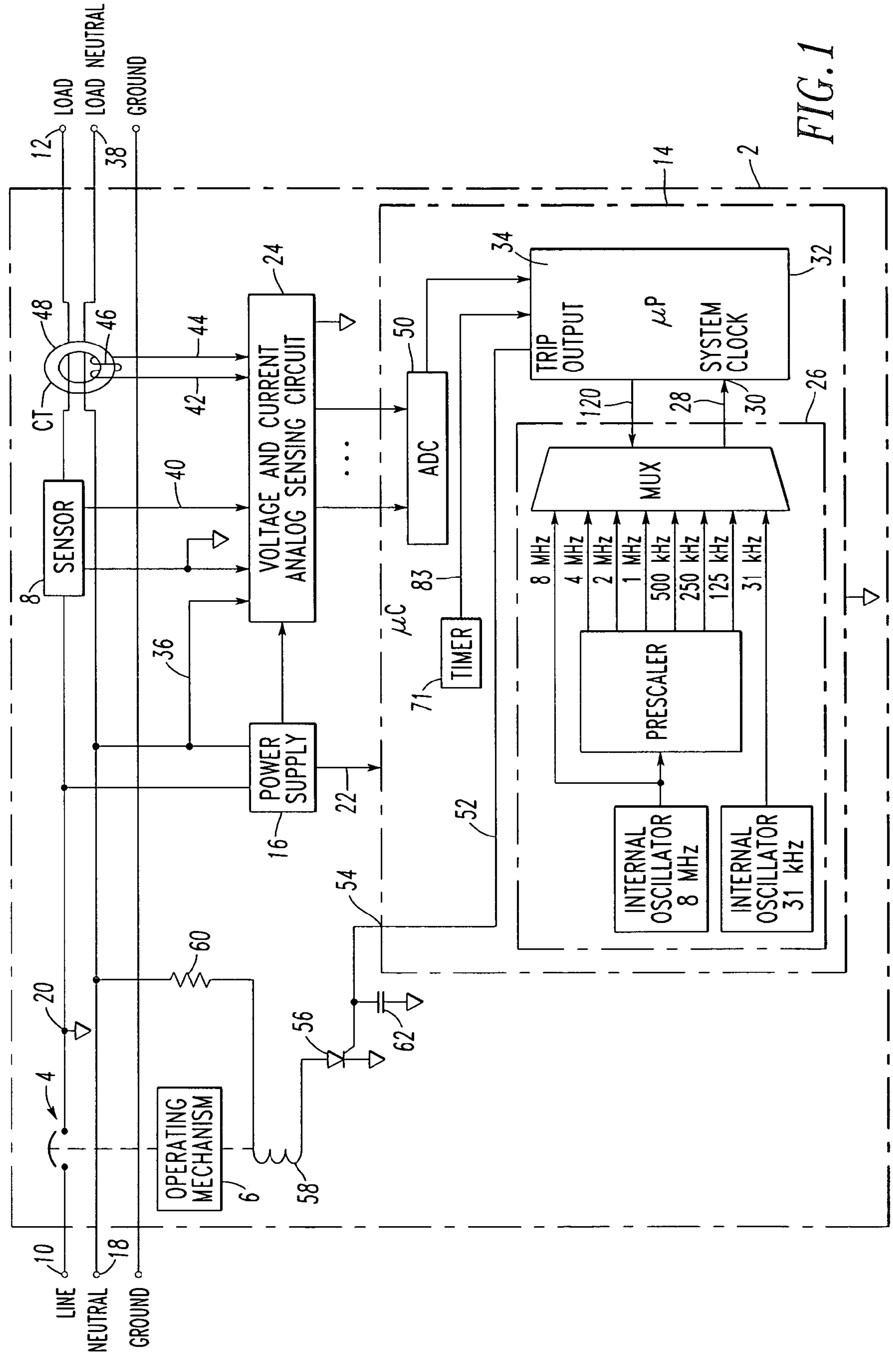
FIG. 1 is a block diagram in schematic form of a circuit breaker in accordance with an embodiment of the invention.

Referring to FIG. 1, a miniature circuit breaker 2 includes separable contacts 4, an operating mechanism 6 structured to open and close the separable contacts 4, and a sensor 8 structured to sense current flowing through the separable contacts 4 between a line terminal 10 and a load terminal 12. The circuit breaker 2 also includes a processor, such as the example microcomputer (μC) 14 (e.g., without limitation, a Microchip PIC16F685 microcontroller, marketed by Microchip Technology Incorporated of Chandler, Ariz.), cooperating with the sensor 8 and the operating mechanism 6 to trip open the separable contacts 4, and a power supply 16 structured to at least power the μC 14. The power supply 16 is, for example, an alternating current (AC) to direct current (DC) (AC/DC) power supply which receives a line-to-neutral voltage 36 between a neutral terminal 18 and a common reference node 20 that is disposed between the separable contacts 4 and the sensor 8. The AC/DC power supply 16 provides a suitable DC voltage 22 to the μC 14 and, as needed, powers an analog sensing circuit, such as the example voltage and current analog sensing circuit 24.

The μC 14 includes a configurable clock circuit 26 which supplies a configurable clock 28 to a system clock input 30 of a microprocessor (μP) 32. The μP 32 includes a routine 34 structured to reduce current consumption from the power supply 16 through modulation of the configurable clock 28, as will be described.

The voltage and current analog sensing circuit 24 receives inputs of the line-to-neutral voltage 36 from the neutral terminal 18 and the load neutral terminal 38, a voltage 40 representative of the current flowing through the current sensor 8, and signals 42,44 from the secondary 46 of a current transformer (CT) 48, which detects a ground fault condition responsive to any significant difference between the line and neutral currents. The various voltage and current signals from the voltage and current analog sensing circuit 24 are input by a plural channel analog to digital converter (ADC) 50 of the μC 14 and are converted to corresponding digital values for input by the μP 32.

Responsive to one or more current conditions as sensed from the voltage 36, the voltage 40 and/or the signals 42,44, the μP 32 generates a trip signal 52 that passes through the μC 14 to output 54 to turn SCR 56 on. The SCR 56, in turn, energizes a trip solenoid 58 and, thereby, actuates the operating mechanism 6 to trip open the separable contacts 4 in response to an overvoltage, an arc fault, a ground fault or other trip condition. The trip solenoid 58 is, thus, a trip actuator cooperating with the μP 32 and the operating mechanism 6 to trip open the separable contacts 4 responsive to one of the different trip conditions from the μP 32. A resistor 60 in series with the coil of the solenoid 58 limits the coil current and a capacitor 62 protects the gate of the SCR 56 from voltage spikes and false tripping due to noise.

Figure 2:
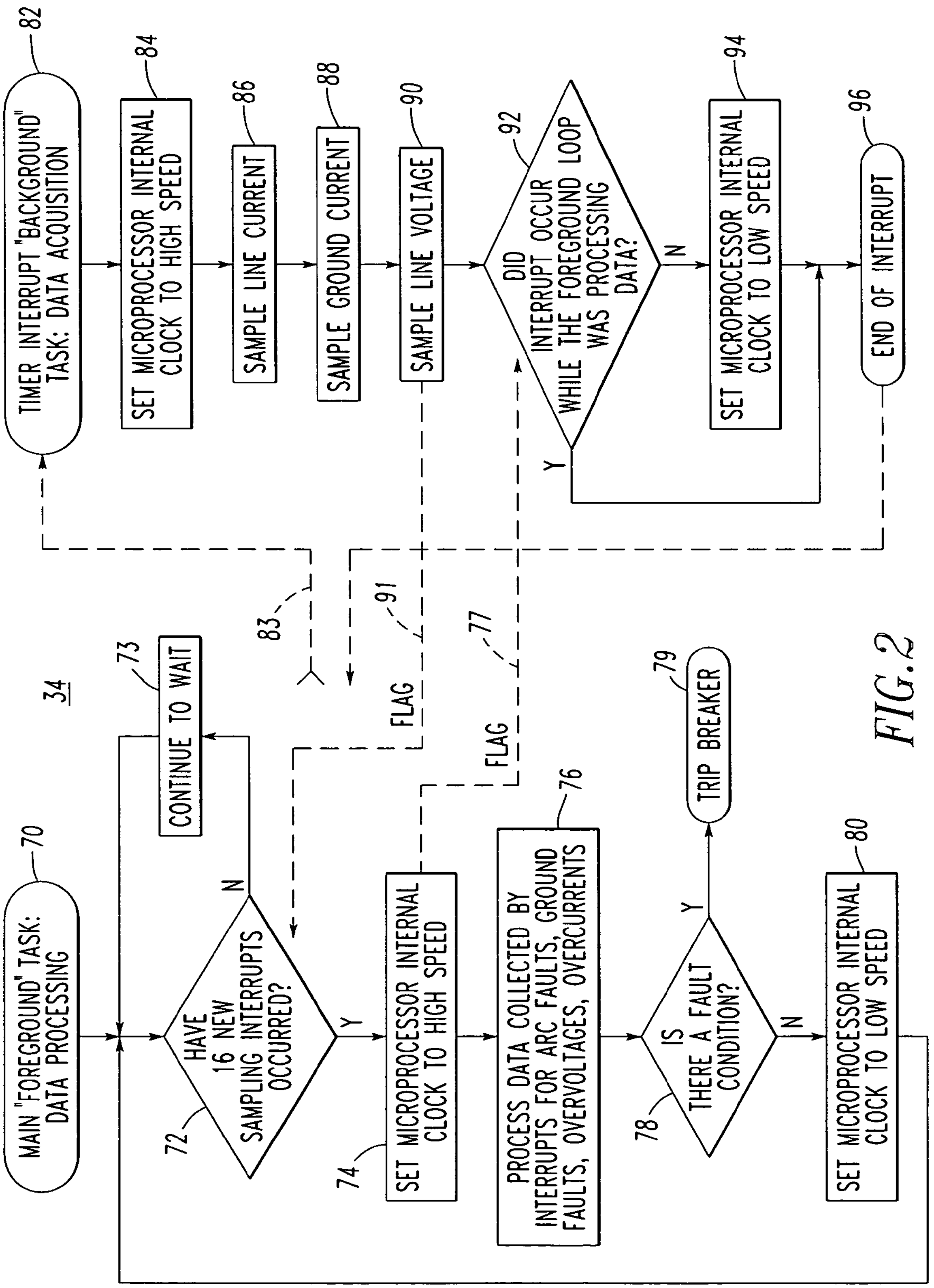
FIG. 2 is a flowchart of a routine including a foreground loop and a background loop executed by the microprocessor of FIG. 1.

FIG. 2 shows one example structure of the routine 34 for the μC-based miniature circuit breaker 2 of FIG. 1. A main “foreground” loop 70 processes data that is periodically collected (e.g., acquired) in response to a periodic timer interrupt 83 from a timer 71 (FIG. 1) by a “background” loop 82. The μP system clock input 30 (FIG. 1) operates at a relatively high frequency (e.g., without limitation, about 8 MHz) only when data processing by the foreground loop 70 or data acquisition by the background loop 82 occurs. During the remainder of the time, the μP internal clock frequency is reduced (e.g., without limitation, by a factor of 64 to about 125 kHz), to minimize power supply current consumption by the μC 14.

In the main foreground loop 70, at 72, it is determined if 16 new sampling interrupts occurred. If not, then the loop 70 continues to wait at 73 before checking the test at 72. Otherwise, if 16 new sampling interrupts have occurred (e.g., flag 91 is true), then, at 74, the μP internal system clock input 30 is set to high speed (e.g., without limitation, about 8 MHz). Next, at 76, the data collected in response to the various timer interrupts by the background loop 82 (e.g., without limitation, for arc fault, ground fault, overvoltage and/or overcurrent conditions) is suitably processed using any known or suitable techniques. Before starting step 76 (e.g., as part of step 74), a flag 77 is set. Then, before starting step 78 (e.g., at the end of step 76), the flag 77 is reset. Alternatively, the flag 77 may be reset after step 78 instead of after step 76. Next, at 78, it is determined if there is a fault condition. If so, then at 79, the μP 32 trips the circuit breaker 2 by outputting the trip signal 52 (FIG. 1). If not, then, at 80, the μP internal system clock input 30 is set to low speed (e.g., without limitation, about 125 kHz) before execution resumes at 72. Lowering this frequency when the routine 34 is otherwise idle, reduces current consumption from the power supply 16 (FIG. 1). Hence, the foreground loop 70, at 76,78, determines whether a fault condition has occurred and responsively trips the circuit breaker 2 responsive to the fault condition at 79, or lowers the frequency of the μP system clock input 30 responsive to the absence of the fault condition at 80.

In response to the periodic timer interrupt 83 (e.g., without limitation, about 16 times per half-cycle of the line-to-neutral voltage) from the timer 71 (FIG. 1), the background loop 82 performs data acquisition. Thus, the timer 71 interrupts the foreground loop 70 a plurality of times per voltage half-cycle to collect the data by the background loop 82. This background loop 82 periodically collects information about the condition of the protected circuit and the circuit breaker 2. The timer interrupt 83 may occur, for example, during any of steps 70,72,73,74,76,78,80. Next, at 84, the μP internal system clock input 30 is set to high speed (e.g., without limitation, about 8 MHz). Then, steps 86, 88 and 90 respectively sample the line current, the ground current and the line-to-neutral voltage. When the background loop 82 has collected a predetermined count (e.g., without limitation, 16) of sets of samples corresponding to the same count of timer interrupts, the background loop passes a flag 91 to the foreground loop 70 to cause the foreground loop to process the data at step 76.

Next, at 92 of the background loop 82, it is determined if the timer interrupt 83 occurred while the foreground loop 70 was processing data. If the flag 77 is reset, then this test is false and the µP internal system clock input 30 is set to low speed (e.g., without limitation, about 125 kHz) at 94. Otherwise, the flag 77 is set, the test at 92 is true, and the UP internal system clock input 30 remains at high speed. In that event, or after step 94, the end of interrupt is executed at 96 and execution resumes, again, in the foreground loop 70. In this manner, the routine 34 lowers, at 80 or 94, the frequency of the internal system clock input 30 when the background loop 82 is not periodically collecting the data and when the foreground loop 70 is not processing data from the background loop 82.

Figure 3:
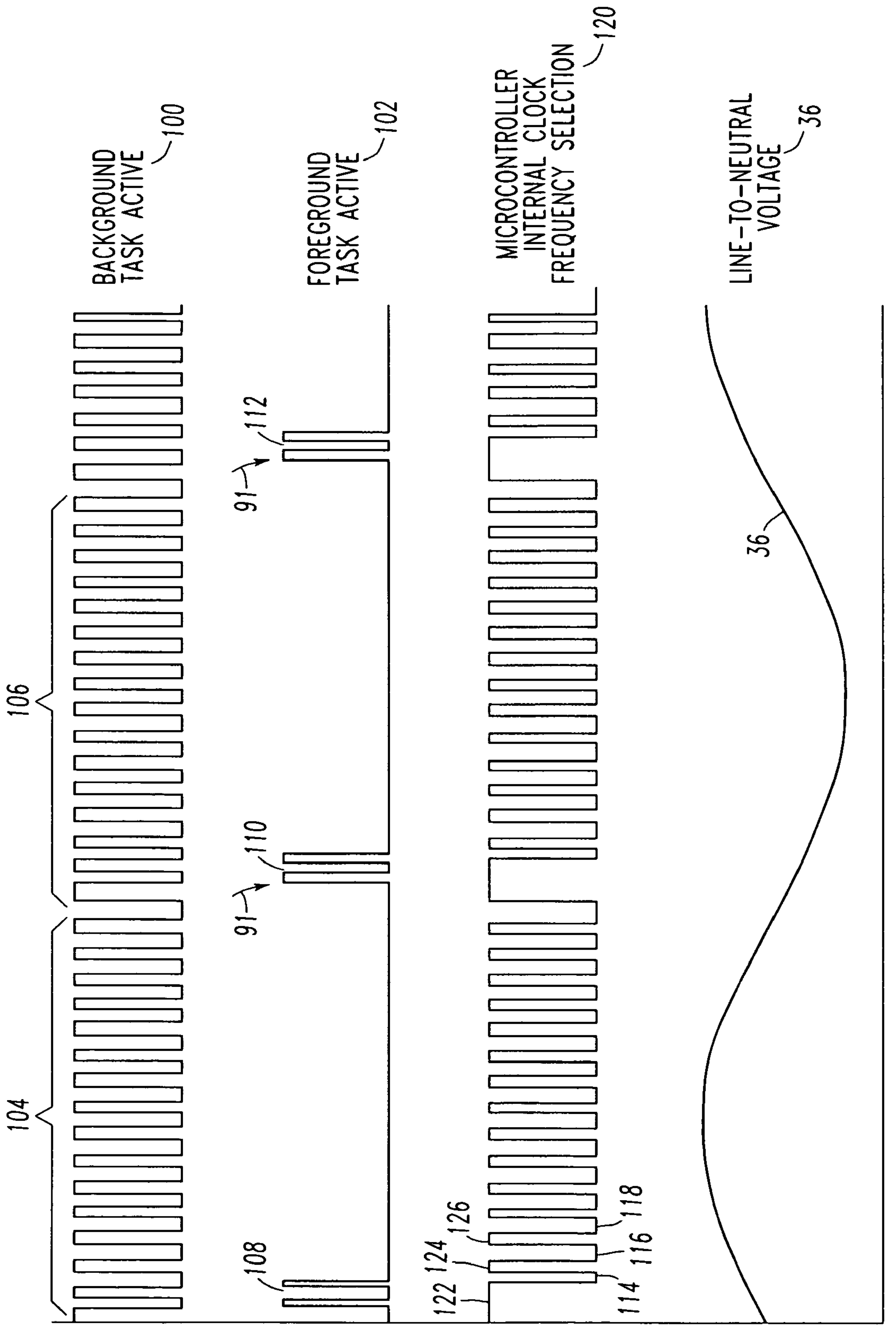
FIG. 3 are plots of activity of the background loop, activity of the foreground loop, microprocessor internal clock frequency selection and line voltage versus time for the microprocessor of FIG. 1.

FIG. 3 shows the operation of the circuit breaker routine 34 of FIG. 2 and, in particular, the activity 100 of the background loop 82 and the activity 102 of the foreground loop 70 of FIG. 2. The example timer interrupt 83 (FIGS. 1 and 2) initiates the background loop 82 sixteen times per voltage half-cycle to collect data, as shown at 104 or 106. When the background loop 82 has collected sixteen sets of samples, it passes the flag 91 telling the foreground loop 70 to process the data. The timer interrupt 83 for the background loop 82 interrupts processing by the foreground loop 70, as shown, for example, at 108, 110 or 112.

FIG. 3 also shows that when neither the foreground loop 70 nor the background loop 82 of FIG. 2 is active, the frequency of the µP internal system clock input 30 can be reduced (e.g., without limitation, from 8 MHz to 125 kHz), for example, at 114, 116 or 118, or whenever the signal 120 is low, in order to minimize the current consumption of the µC 14. In this particular example, the foreground and background loops 70,82 are active only about 50% of the time. Therefore, the µP routine 34 operates in a reduced clock frequency/reduced current consumption mode during the remaining about 50% of the time, thereby significantly lowering the average current consumed by the µC 14. This reduces the demand on the power supply 16 (FIG. 1) that supplies the µC 14, which results in less thermal dissipation and stress (e.g., without limitation, in resistor-coupled power supplies of the type used in, for example, miniature circuit breakers), higher efficiency and potentially lower component costs. Otherwise, when the signal 120 is high (e.g., at 122, 124 or 126), the µP routine 34 operates in the normal clock frequency/normal current consumption mode when either one of the loops 70,82 is active.

A significant advantage of operating the circuit breaker µP 32 at a reduced clock frequency is that it consumes relatively less power supply current. For example, the circuit breaker power supply current consumption is reduced by lowering the frequency of the µP internal system clock input 30 during any time interval when the routine 34 is idle. Reducing the current needed to power the electronics in, for example, the miniature circuit breaker 2 is critical to reducing the thermal dissipation and average losses in the circuit breaker electronics power supply 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:

separable contacts;

an operating mechanism structured to open and close said separable contacts;

a sensor structured to sense current flowing through said separable contacts;

a processor cooperating with said sensor and said operating mechanism to trip open said separable contacts;

a power supply structured to at least power said processor, wherein said processor includes a configurable clock, wherein said processor further includes a routine structured to reduce current consumption from said power supply through modulation of said configurable clock, wherein said routine includes a background loop and a foreground loop, wherein said background loop is structured to periodically collect data from said sensor, wherein said foreground loop is structured to process said data from the background loop, wherein said configurable clock has a frequency, wherein said background loop is further structured to raise the frequency of said configurable clock and collect a sample of current from said sensor, wherein said processor is a microcomputer including a timer; and wherein said background loop is further structured to periodically execute responsive to an interrupt from said timer, to determine if said foreground loop was processing said data, and to responsively either: return execution to said foreground loop without lowering the frequency of said configurable clock responsive to said foreground loop processing said data, or lower the frequency of said configurable clock responsive to said foreground loop not processing said data.

2. The circuit interrupter of claim 1 wherein said timer interrupts said foreground loop a plurality of times per voltage half cycle to collect said data by said background loop.

3. The circuit interrupter of claim 2 wherein when said background loop has collected a plurality of samples corresponding to said plurality of times, said background loop passes a flag to said foreground loop to cause said foreground loop to process said data.

4. The circuit interrupter of claim 2 wherein one of said background loop and said foreground loop is active about one-half of the time; and wherein said routine is further structured to raise the frequency of said configurable clock during said one-half of the time and, otherwise, to lower the frequency of said configurable clock.

* * * * *